(12) United States Patent
Hodneland et al.

(10) Patent No.: US 12,515,314 B2
(45) Date of Patent: Jan. 6, 2026

(54) MODULAR ROBOT

(71) Applicant: Equanostic AS, Oslo (NO)

(72) Inventors: Oyvind Lunde Hodneland, Oslo (NO); Andreas Reason Dahl, Oslo (NO); Stig Stoa, Oslo (NO)

(73) Assignee: Equanostic AS, Oslo (NO)

( * ) Notice: Subject to any disclaimer, the term of this patent is extended or adjusted under 35 U.S.C. 154(b) by 0 days.

(21) Appl. No.: 18/996,495

(22) PCT Filed: Sep. 4, 2023

(86) PCT No.: PCT/IB2023/058744
§ 371 (c)(1),
(2) Date: Jan. 17, 2025

(87) PCT Pub. No.: WO2024/052802
PCT Pub. Date: Mar. 14, 2024

(65) Prior Publication Data
US 2025/0256392 A1    Aug. 14, 2025

(30) Foreign Application Priority Data
Sep. 8, 2022 (GB) .................................... 2213172

(51) Int. Cl.
*B25J 9/16* (2006.01)
*B25J 5/00* (2006.01)
(Continued)

(52) U.S. Cl.
CPC .................. *B25J 9/08* (2013.01); *B25J 5/007* (2013.01); *B25J 9/161* (2013.01); *B25J 13/08* (2013.01); *G01N 22/02* (2013.01); *G01N 29/041* (2013.01); *G01N 29/07* (2013.01); *G01N 29/265* (2013.01); *G01B 17/02* (2013.01);
(Continued)

(58) Field of Classification Search
CPC ..... B25J 9/08; B25J 5/007; B25J 9/161; B25J 13/08
See application file for complete search history.

(56) References Cited

U.S. PATENT DOCUMENTS 4,955,235 A   9/1990  Metala et al.
5,333,502 A   8/1994  Clark, Jr. et al.
(Continued)

FOREIGN PATENT DOCUMENTS

CN    109483561 A    3/2019
CN    208703412 U    4/2019
(Continued)

OTHER PUBLICATIONS

Dickens et al., BEETLE—a modular electronics family for robotics, 2015, IEEE, p. 148-153 (Year: 2015).*
(Continued)

*Primary Examiner* — McDieunel Marc
(74) *Attorney, Agent, or Firm* — Dinsmore & Shohl LLP

(57) ABSTRACT

A modular robot (11) has an elongated body portion (14) including at least one interchangeable module (29) having an elongated profile containing circuitry configured to implement a predetermined functionality of the robot. At least one motherboard (37) is disposed at at least one end of the robot and is configured to connect to the module circuitry.

20 Claims, 7 Drawing Sheets

(51) Int. Cl.
    *B25J 9/08*     (2006.01)
    *B25J 13/08*     (2006.01)
    *G01N 22/02*     (2006.01)
    *G01N 29/04*     (2006.01)
    *G01N 29/07*     (2006.01)
    *G01N 29/265*     (2006.01)
    *G01B 17/02*     (2006.01)
    *G01S 13/88*     (2006.01)
    *G01S 15/89*     (2006.01)

(52) U.S. Cl.
    CPC ............... *G01N 2291/105* (2013.01); *G01N 2291/2636* (2013.01); *G01S 13/88* (2013.01); *G01S 15/89* (2013.01)

(56) References Cited

U.S. PATENT DOCUMENTS

| | | | |
|---|---|---|---|
| 10,093,403 B2 | 10/2018 | Williams | |
| 11,351,680 B1* | 6/2022 | Rosenberg | B25J 19/0095 |
| 11,980,432 B2* | 5/2024 | Moskowitz | A61B 34/32 |
| 12,253,849 B2* | 3/2025 | Thimmanaik | G05B 23/0294 |
| 2020/0262261 A1 | 8/2020 | Loosararian et al. | |
| 2020/0281670 A1* | 9/2020 | Moskowitz | A61B 34/30 |
| 2020/0284390 A1 | 9/2020 | Kwan | |
| 2020/0284759 A1 | 9/2020 | Thompson et al. | |

FOREIGN PATENT DOCUMENTS

| | | |
|---|---|---|
| CN | 209041858 U | 6/2019 |
| CN | 111895217 A | 11/2020 |
| CN | 112881513 A | 6/2021 |
| EP | 0301906 A2 | 2/1989 |

OTHER PUBLICATIONS

Gao et al., Rhino: An Open-source Embedded Motherboard Design Enabling Complex Behavior of Intelligent Robots, 2019, IEEE, p. 1568-1573 (Year: 2019).*

Netzev et al., Many Faced Robot—Design and Manufacturing of a Parametric, Modular and Open Source Robot Head, 2019, IEEE, p. 342-348 (Year: 2019).*

Xuan et al., Methods to Modular Robot Design, 2008, IEEE, p. 663-668 (Year: 2008).*

International Search Report and Written Opinion dated Nov. 3, 2023, pertaining to Int'l Patent Application No. PCT/IB2023/058744, 6 pgs.

UKIPO Search Report dated Nov. 8, 2022, pertaining to GB Patent Application No. 2213172.6, 13 pgs.

International Preliminary Report on Patentability dated Jul. 10, 2024, pertaining to Int'l Patent Application No. PCT/IB2023/058744, 17 pgs.

* cited by examiner

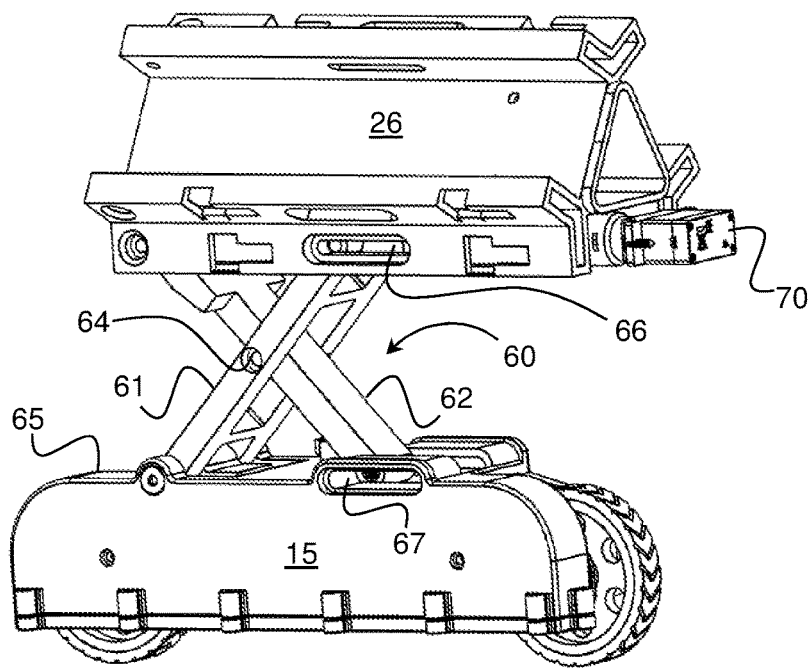
Fig. 11
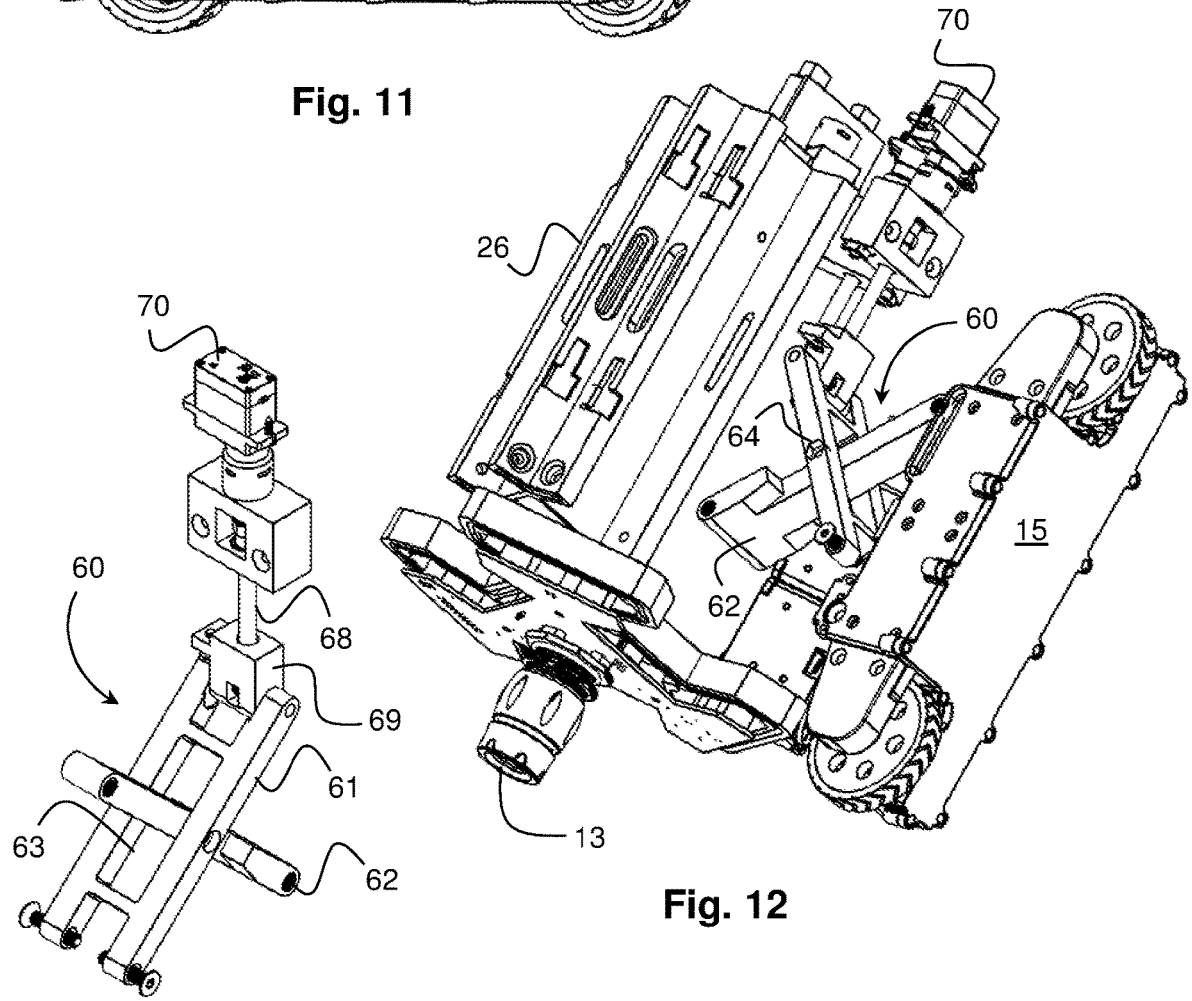
Fig. 13
Fig. 12

MODULAR ROBOT

FIELD OF THE INVENTION

This invention relates generally to robots, particularly but not exclusively, those configured for self-navigation through internal bores and pipelines.

BACKGROUND OF THE INVENTION

Robots for inspection of pipelines and industrial surfaces are well-known. For example, US 2020/0262261 assigned to Gecko Robotics, Inc., discloses an inspection robot that includes a robot body, at least two sensors, a drive module, a stability-assist device and an actuator. The sensors are positioned to interrogate an inspection surface and are communicatively coupled to the robot body. The drive module includes at least two wheels that engage the inspection surface.

The two or more sensors, which may be of the same or different types, for example ultrasound and γ-ray, may serve to serially collect data from the same location, or to provide predictive sensing from a first sensor to determine if a second sensor should take data on the same location at a second time during a single run of the robotic vehicle. For example, an ultra-sonic sensor mounted on a leading sensor sled taking data on a location may determine that a γ-ray measurement should be taken for the same location by a sensor mounted on a trailing sensor sled configured to travel over the same location as the leading sensor. They may also provide redundant sensor measurements from a plurality of sensors located in leading and trailing locations (e.g., located on the same or different sensor sleds to repeat sensor data collection), and the like.

KR102091983 discloses a robot adapted for traction along the inner wall surface of a pipe, and whose driving portion may be expanded or reduced to accommodate changes in pipe diameter. Different modules may be installed on the head, allowing various tasks such as grinding, welding, inspecting and so on, to be performed within the pipe simply by replacing the modules.

CN109483561 discloses a modular crawler-type internal pipe inspection robot, comprising a main body mechanism, a modular support mechanism and a modular crawler mechanism. The main body mechanism is in the form of a hollow cylindrical machine frame capable of carrying various mutually independent modules mounted on the robot and providing power for the modules carried on the robot. By such means, different traction modules, for example, can be supported to allow for different gauge pipes. Likewise, in the event of a fault in one of the modules, it can be replaced without the need to replace the complete robot.

While both of these documents describe modular robots, the modularity is very limited and highly specific. Thus, both allow for different heads to be coupled to an end of the robot. In the case of KR102091983, the heads are tools configured to perform different tasks and are fed both control and power signals from the robot via a common coupler interface. In the case of CN109483561, although different gauge traction modules can be coupled to the body, they are functionally identical and may thus be activated using the same control and power signals.

SUMMARY OF THE INVENTION

The invention provides a modular robot that includes one or more interchangeable modules each adapted to perform a respective function, whereby the robot may be adapted to perform a desired function merely by inserting a suitable custom module.

To this end, there is provided in accordance with an aspect of the invention a modular robot comprising:

an elongated body portion including at least one interchangeable module having an elongated profile containing circuitry configured to implement a predetermined functionality of the robot, and at least one motherboard disposed at at least one end of the robot and configured to connect to said circuitry.

The modules may be associated with propulsion elements or sensors or actuators that operate in accordance with custom circuits inside the module to determine how the robot performs the desired functions. The custom circuit inside at least one module is removably coupled to the motherboard at the end of the robot, which typically includes a processor that oversees the operation of the custom circuit and typically provides a common power and data bus for each of the custom circuits. Not all modules need include its own custom circuit since a custom circuit in one module may serve to control more than one module. This may be desirable, for example, when two or more identical modules are employed, such as identical propulsion elements each of which operates in like manner, and so can be controlled by a common circuit. However, it may be applicable even when the modules are different. For example, different sensors may be controlled by a common circuit that conveys power and control signals to each sensor and relays the respective sensor signals to the motherboard for post-processing.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 11 is a partial perspective view of the modular robot showing a propulsion element according to an embodiment of the invention;

FIG. 12 is a partial exploded view showing a detail of the propulsion element shown in FIG. 11;

FIG. 13 is a detailed perspective view of a propulsion element mechanism;

DETAILED DESCRIPTION OF EMBODIMENTS

In the following description of some embodiments, identical components that appear in more than one figure or that share similar functionality will be referenced by identical reference symbols.

Figure 1:
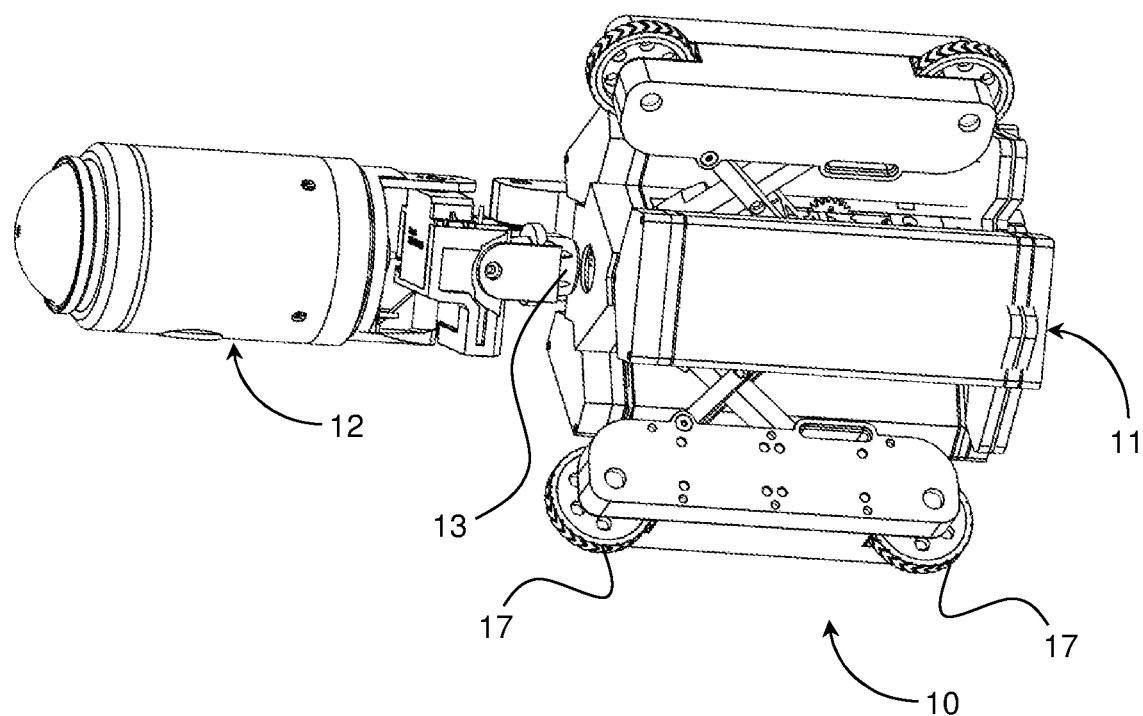
FIG. 1 is a perspective view of a pipe-inspection system comprising a robot coupled to a sensor head according to the invention.
Figure 2:
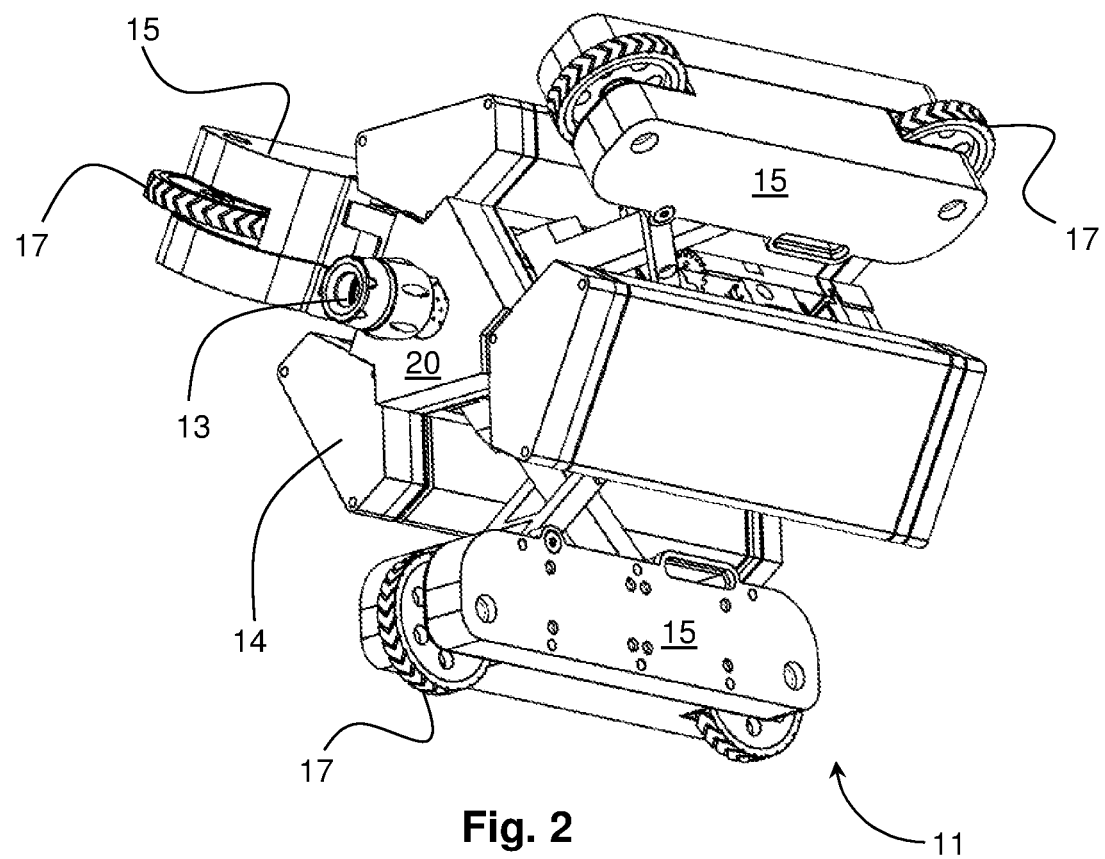
FIG. 2 is a perspective view showing a proximal end of the robot.

FIGS. 1 and 2 show pictorial perspective views of a pipe-inspection system 10 comprising a modular robot 11 to which a sensor head 12 may be removably coupled by means of a universal coupler 13, which in addition to achieving a sound mechanical connection also conveys power and control signals from the robot to the sensor head. Although the universal coupler is shown as a unitary element, it will be appreciated that separate connectors may be provided for power and control as well as for mechanical attachment. These signals may be transmitted to the robot wirelessly or via a cable (not shown). The universal coupler 13 feeds electrical power to the sensor head 12 as well as control signals for operating its sensors and for feeding sensor signals corresponding to measured signals to be fed back to the operator, either via the robot cable or wirelessly. The robot 11 has a body portion 14 around which, in the embodiment shown in the figures by way of example only, are supported three wheel carriages 15 that are mutually angularly spaced apart by 120° and which may be independently extended and retracted by armatures (shown as 61 and 62 in FIG. 11). Each carriage 15 supports a pair of wheels 17 although other traction elements may be used such as tracks. During horizontal movement, any two carriages form a wheel base whose respective pairs of wheels 17 engage and ride along an inner surface of a pipe while ensuring that if the robot turns over about a longitudinal axis, it will retain wheel contact with the pipe's inner surface. Alternatively, the armatures of all three carriages 15 can be extended in order to create tension of the wheels against the pipe surface. This allows better position control. In inclines, vertical pipes, or in the presence of liquid or gas flow, the wheels get better grip due to the leg tension. In the presence of liquids in the pipe, the upper one or two wheel modules also counteract the robot body buoyancy. These features are known per se, thus rendering unnecessary further details of the mechanical construction of the robot.

Figure 3:
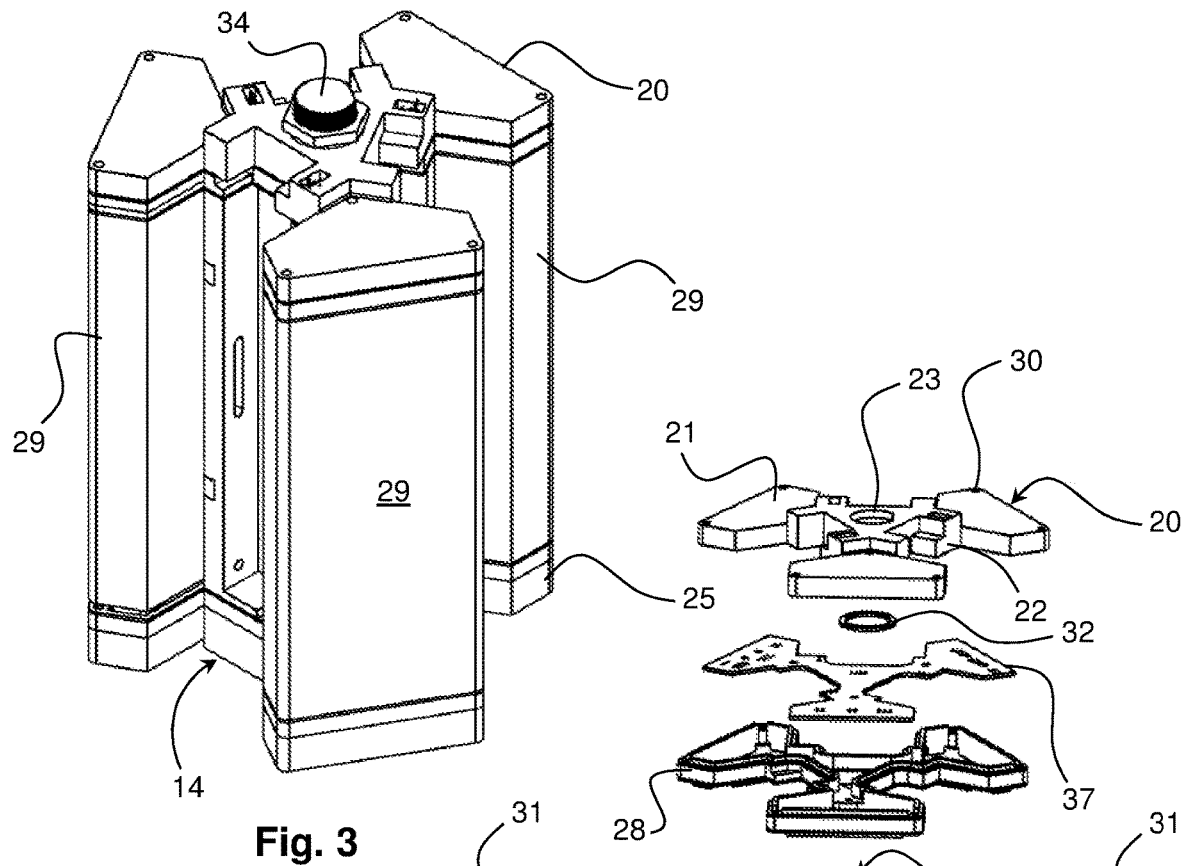
FIG. 3 is a partial perspective view of the robot formed of an interchangeable modular construction in accordance with an embodiment of the invention.
Figure 4:
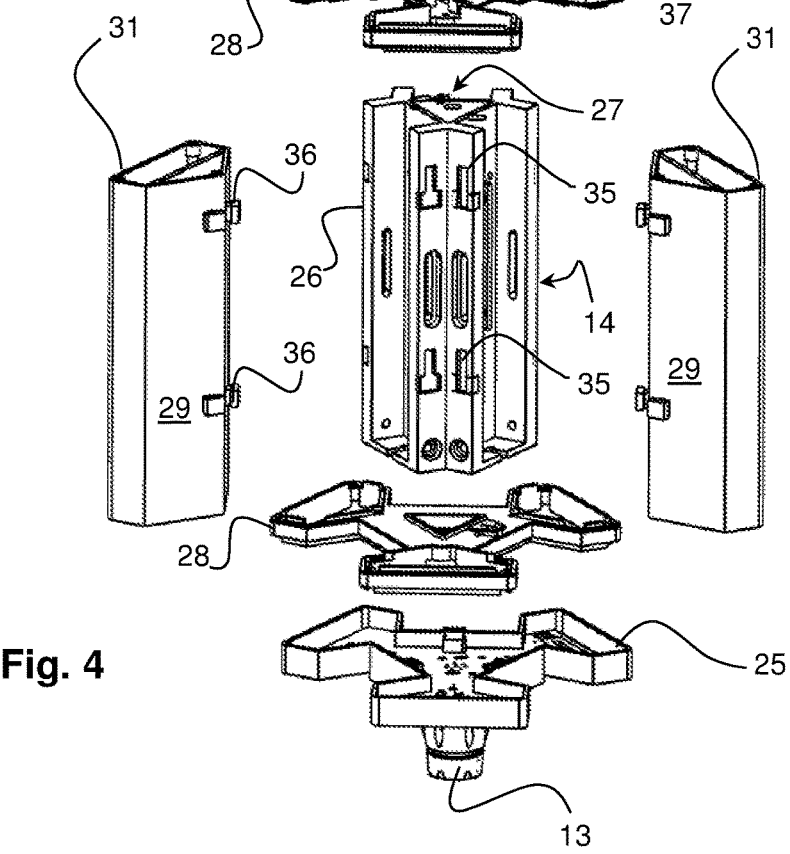
FIGS. 4 and 5 are partial perspective exploded views of the modular robot.

Referring to FIGS. 3 and 4 there are shown, respectively, a partial perspective view and a partial exploded view of the robot 11 formed of an interchangeable modular construction in accordance with an embodiment of the invention. In both figures the wheel carriages 15 have been removed so as to show more clearly the central body portion 14 having an upper end cap 20 in the form of a generally equiangular 3-point star formed of three pentagonal flanges or end plates 21 around a central hub 22 having a central aperture 23. It will be readily understood that the shape of the end caps and the number of modules that can be accommodated around the periphery of the body portion 14 may be different from what is shown in the figures. At the lower end of the body portion there is a lower end cap 25 of generally similar shape supporting the universal coupler 13. Each of the end plates 21 has a rectangular base portion from whose upper apices project a triangular roof so that the end plate has five edges, its upper apex abutting an indent in the hub. For the sake of abundant clarity, it is noted that the terms 'upper' and 'lower' identify the location of the end caps in the figure and are not intended to ascribe positional limitations to the robot. It will also be appreciated that in actual use, the planes of the end caps 21 and 25 are substantially normal to the direction of propagation of the robot.

The body portion 14 comprises an elongated frame 26 supported between upper and lower end portions 27 of complementary shape to the upper and lower end caps 20, 25 both of which are recessed for accommodating the respective end portions 27. Projecting from each of the lower and upper ends of the body portion 14 there are thus formed three equiangular spaced apart pentagonal end plates 28 between which there are supported respective modules 29 each having a pentagonal cross-section. For clarity, one of the modules has been removed in FIG. 4. When assembled, the opposing ends of the three modules 29 are tightly accommodated within recesses of the respective end plates 28, after which the end caps 20 and 25 are fitted and secured. To this end, small apertures 30 are formed in the corners of the end caps through which screws (not shown) engage threaded apertures 31 formed in abutting corners of the modules 29. The upper end cap 20 is screwed on to the body portion 14 through an O-ring 32 by means of a bolt 34 shown in FIG. 3. The O-ring serves to ensure tightness of the bolt 34 within the end cap 20. During assembly, the modules 29 are hooked on to the frame 26 by means of complementary sockets 35 and pins 36, prior to securing the end caps 20 and 25. Other forms of attachment will clearly be apparent to those skilled in the art without departing from the scope of the present invention.

Figure 5:
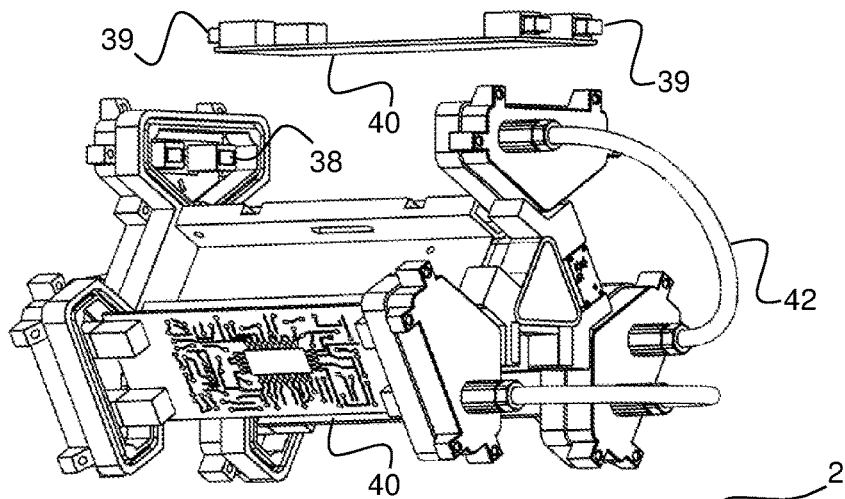
Figure 6:
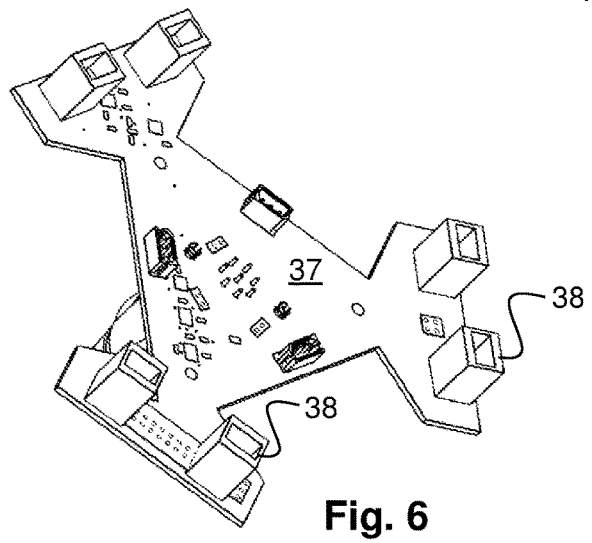
FIG. 6 is a perspective view of a printed circuit board (PCB) mounted at one end of the robot for coupling to a custom PCB.
Figure 7:
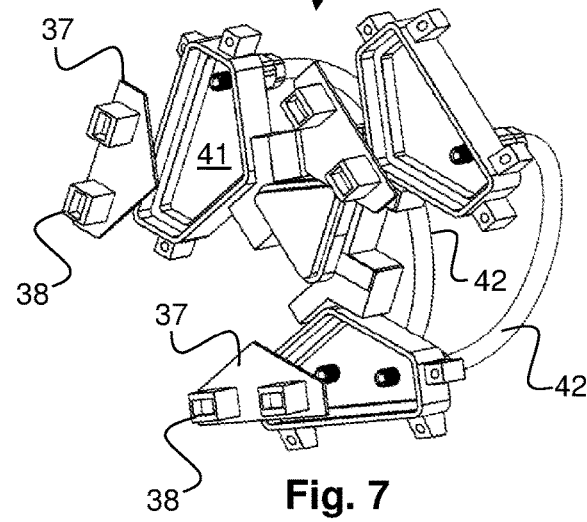
FIG. 7 is a perspective exploded view of an end-cap mounted at one end of the robot accommodating PCBs each for coupling to a respective custom PCB.

As best seen in FIGS. 5 to 7, there may be mounted in either or both of the end caps 20 and 25 respective printed circuit boards (PCBs) 37 having connectors 38 to which complementary connectors 39 connected to PCBs 40 inside the modules 29 may connect when the robot is assembled. The PCBs 37 serve as a motherboard to which the PCBs 40 inside the modules may be connected. Each of the PCBs 40 constitutes a respective custom circuit that determines how the robot performs a desired function associate with one or more modules. The motherboard constituted by the PCB 37 typically includes a processor that oversees the operation of the PCBs 40 and typically provides a common power and data bus for each of the custom circuits.

Not all modules need include its own custom circuit since a custom circuit in one module may serve to control more than one module. Likewise, although the PCB 40 shown in FIG. 5 is plugged into opposing motherboards at each end of the robot, this is by way of example only. In some embodiments, a unitary motherboard such as shown in FIG. 6 is employed at only one end of the robot and is dimensioned and shaped to cover substantially the full area of the end cap 20. In some embodiments, the functionality of the motherboard may be realized by one or more smaller PCBs, such as shown in FIG. 7, which shows two such PCBs 37 each mounted in respective cavities 41 of the end cap 20. The two PCBs 37 serve as the motherboard and are connected to respective custom circuits 40 in modules abutting the respective cavities. The custom circuit 40 in the third module abuts an empty cavity 41 and is coupled to one or both of the PCBs 37 in the other cavities via external cables 42 that are coupled to the custom circuit 40 via suitable connectors. In other embodiments, two motherboards of the kind shown in FIG. 6 may be employed; while in other embodiments, the configuration of FIG. 7 may be adopted at both ends of the robot. In some embodiments, one or more custom circuits are directly connected to the motherboard and are connected to one or more custom circuits in different modules via external cables 42, as shown in FIGS. 5 and 7 wherein the PCBs 37 may simply serve as connectors and may not support any additional circuitry. Likewise, in some embodiments, only one motherboard at a single end of the robot, such as the PCB 37 shown in FIG. 6 includes processing and power circuitry and the PCBs at the opposite, such as shown in FIG. 7, end may serve only as connectors. In yet further embodiments, only a single motherboard is provided, while at the opposite end the PCBs 37 and connectors 38 are omitted. Alternatively, the connectors 38 at one end may serve only to anchor the PCB 40 so that it is supported at both ends, thereby offering additional support and stability in hostile environments that may be subject to vibration.

Figure 9:
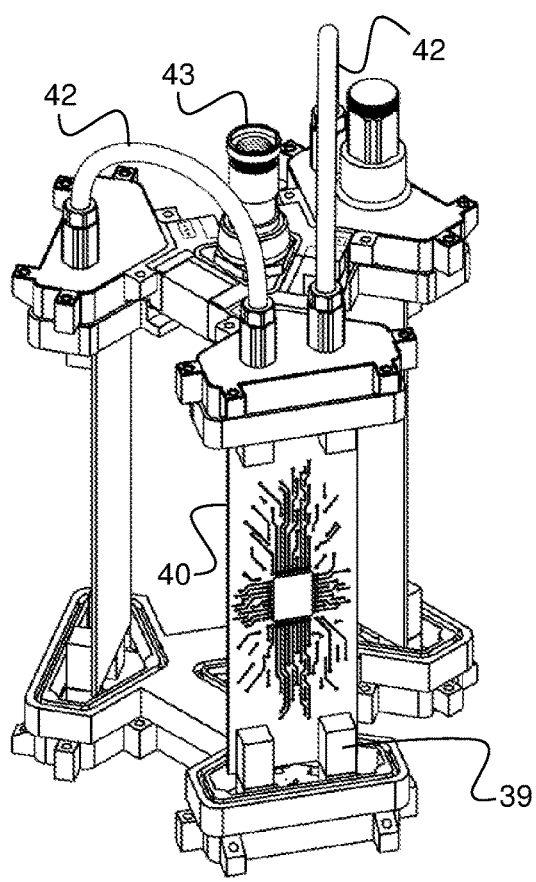
FIG. 9 is a partial perspective view of the modular robot showing three custom PCBs connected between opposing PCBs and being interconnected via external cables.

Regardless of the number of motherboards, whether they are unitary or divided and how they connect to the custom circuits in the different modules, they function as a general-purpose computer having an operating system that is preferably designed to recognize the custom circuits whenever a new module is plugged in. In such manner the operating system is preferably "plug and play", whereby the motherboard detects and installs the module, and configures the system resources and driver software for the module's hardware, whether these are sensors, actuators, propulsion elements or any other component. Plug-and-play is a well-established concept in the art of computers without the need for further description. This being said, the term usually implies that the host operating system or BIOS (Basic Input/Output System) recognizes a new device when it is plugged into the computer. This will not exactly be true in the present invention, because the modules are typically assembled prior to applying power to the motherboard. Nevertheless, when the motherboard is powered on, it will recognize which devices are connected and perform the necessary configuration. Of course, the motherboard does not need to support plug-and-play and the requisite drivers can be loaded manually or downloaded over the Internet either wirelessly or via a Power-over-Ethernet (POE) connection 43, such as shown in FIG. 9.

It will also be appreciated that the connectors 38 and 39 are shown schematically in the figures. In practice, they may be realized by discrete connectors for conveying power and control signals; or they may be in the form of a bus such as a USB. For example, the motherboard 37 may support a USB receptacle to which a complementary USB plug on the custom circuit of the module is connected.

Figure 10:
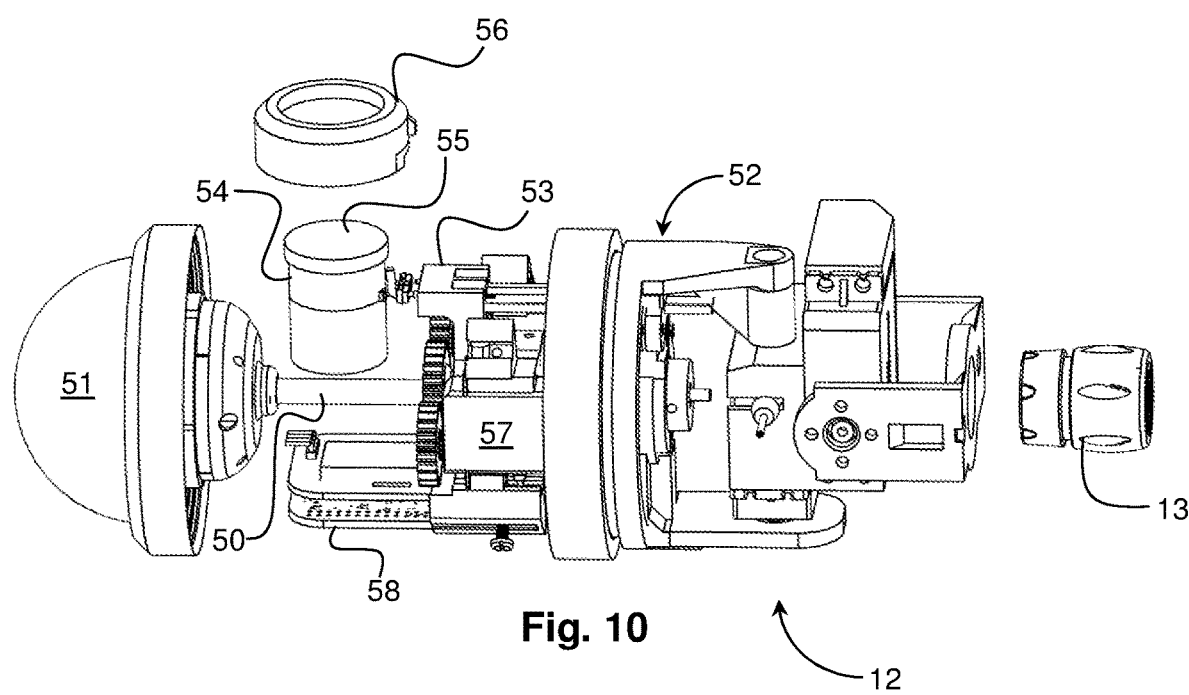
FIG. 10 is a partial exploded perspective view of a sensor head for coupling to one end of the modular robot.

FIG. 10 shows partial details of the sensor head 12 comprising a central rod 50 to a forward end of which is attached a camera 51. At a rear end of the rod 50 is a pan and tilt mechanism 52. A coupling element 53 provides electrical connections to an ultrasonic piezoelectric transducer 54 having an acoustic matching layer 55 retained inside a holder 56 that extends through a sidewall of an outer barrel which is removed in FIG. 10 but shown in FIG. 1. The barrel together with the ultrasonic transducer 54 are rotated by one or more motors 57 around the rod 50, which in some embodiments does not itself rotate. A PCB 58 supports sensors of which the ultrasonic transducer 54 is but an example as well as circuitry that controls the operation of the motor and the sensors, receives sensor signals and optionally processes the signals in situ and/or conveys the signals to an external computer either wirelessly or via the universal coupler 13.

The sensor head 12 is described in more detail in our co-pending British Patent Application No. 2213172.6 for "Dual-Sensor Head for Pipe Inspection Robot and Method of Use" filed Sep. 8, 2022. We omit further description here because the sensor head is merely representative of a module that is interchangeably coupled via the universal coupler 13 to the robot. Upon being so coupled, the PCB 58 may be connected to the motherboard 37, which as explained previously, may be configured to detect the type of sensor head and configure the system resources and driver software accordingly.

In the embodiment shown in FIGS. 1 and 2, the elongated frame 26 supports the wheel carriages 15 each of which constitutes a propulsion element that is propelled by a drive mechanism described below with reference to FIG. 14. Power and control wires may be routed via the PCB 37 at the upper end cap 20 through the module 29 for connection to the universal coupler 13 at the lower end cap 25, Accordingly, the frame 26 may be removed if the robot is propelled by alternative means that do not require the wheel carriages 15 to be supported by the frame 26. Specifically, when the end plates 20 and 25 are secured to opposite ends of the three modules 29, there is formed a secure structure with a central hollow space that may remain empty or in which the frame 26 may be accommodated or exchanged for an alternative propulsion module. If desired, the central hollow space may be filled with suitable material to ensure water tightness or buoyancy.

FIG. 11 shows partial details of the wheel carriages 15 and their manner of attachment to the elongated frame 26. FIG. 12 is a partially exploded view of a wheel carriage mechanism 60 shown detached in FIG. 13 having outer and inner armatures 61 and 62. The outer armature 61 has an opening 63 through which the inner armature 62 is inserted and hinged about a hinge axis 64 to form a collapsible X-shaped mechanism. The outer armature 61 is pivotably attached to an upper surface 65 of the wheel carriage 15 and is slidingly fixed within an elongated slot 66 in an opposing surface of the elongated frame 26. Conversely, the inner armature 62 is pivotably attached to the elongated frame 26 and is slidingly fixed within an elongated slot 67 in the upper surface 65 of the wheel carriage 15. The mechanism 60 is collapsed and expanded by a threaded rod 68 that is articulated to the outer armature 61 by a hinged joint 69 and driven by a servo-motor 70 that is controlled by means of a circuit in one of the modules or directly via the motherboard. The mechanism 60 permits adjustment of the wheel base of the wheel carriage 15, which is useful when the robot is used to inspect inside pipelines of different gauge since the wheel base can be adjusted to best suit the internal diameter of the pipeline.

However, it will be appreciated that alternatively different wheel carriages may be provided each optimized for a pipeline of know gauge, in which case they can be fixedly attached to the frame without the need for an adjustable mechanism. Likewise, extendable and retractable armatures may be used to wipe along the inner wall surface of the pipeline and alternative propulsion elements may be used to drive the robot along the pipe as described below with reference to FIGS. 15 and 16. Also, as noted previously, the wheels may be replaced by tracks or crawler belts.

Figure 14:
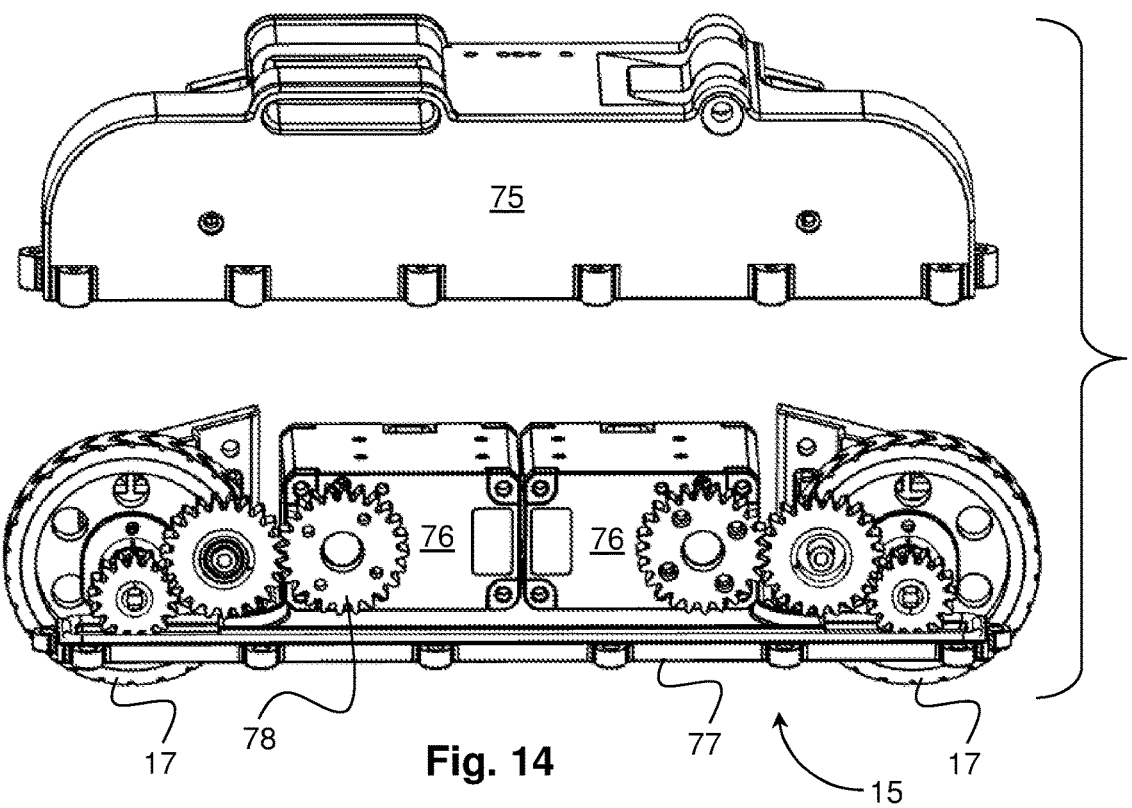
FIG. 14 is a partial exploded view showing a detail of a wheel carriage for use in the propulsion element of FIG. 11.

FIG. 14 is a partial exploded view showing a detail of the wheel carriage 15 with its outer casing 75 removed. A pair of motors 76 are supported by a chassis 77, which supports at opposite ends wheels 17 (as shown in FIG. 1), which are coupled to the motors 76 by respective gear trains 78.

Figure 8:
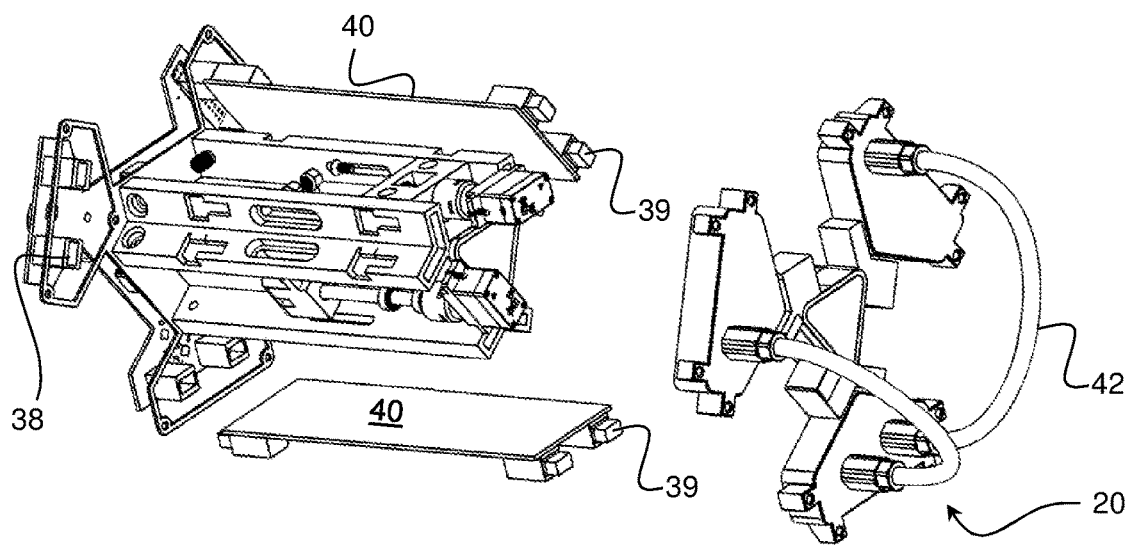
FIG. 8 is a partial perspective exploded view of the modular robot showing a pair of custom PCBs configured for connecting between opposing PCBs.
Figures 15, 16:
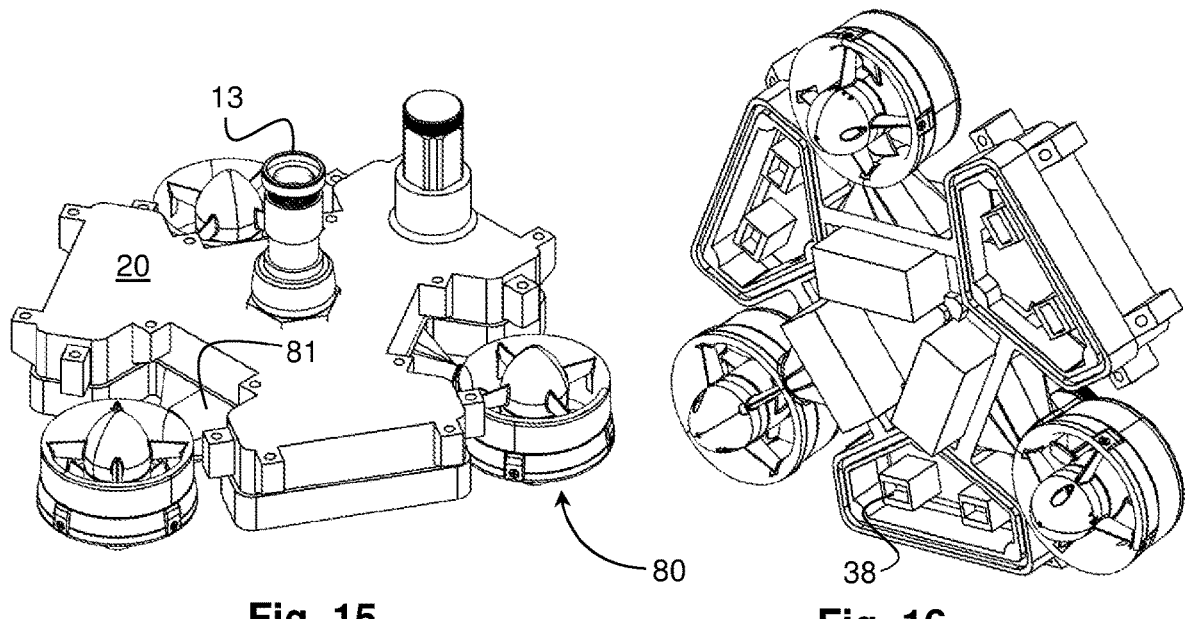
FIGS. 15 and 16 are external and internal perspective views of an alternative end-cap supporting thrusters for propelling the robot.
Figure 17:
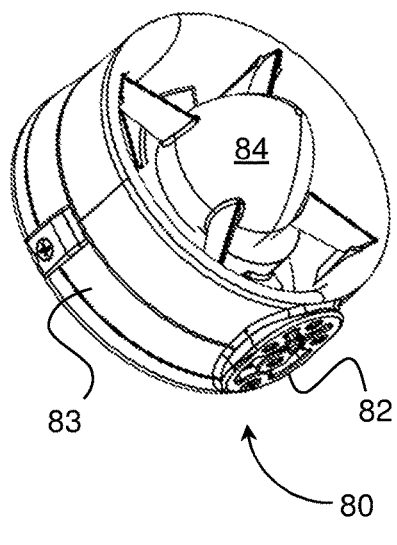
FIG. 17 is a detailed perspective view of the thruster.

FIGS. 15 and 16 show details of an alternative propulsion element in the form of thrusters 80 shown in enlarged detail in FIG. 17. As seen in FIGS. 14 and 15, three thrusters 80 are provided, each supported via a mount 81 to the upper end cap 20. The mount 81 serves as both a mechanical support and as a conduit coupled to an opening 82 in a sidewall 83 of the thruster by means of which drive and control signals are fed to the thrusters 80 via the motherboard 37 (shown in FIG. 7) or via a circuit in one of the modules through the connectors 38. In case of the latter, when the end-cap 20 is mounted on the elongated frame 26, the connectors 38 connect to the PCBs in the respective module and, depending on the configuration, the motherboard or a custom PCB may be configured to detect the thruster and configure the system resources and driver software accordingly. Each thruster 80 includes a motor (not shown) that rotates a propeller 84 that propels the robot through a fluid. When used as part of a pipe-inspection system, the thrusters 80 may be used to propel the robot with attached sensor head though a pipe containing liquid or air. Power may be fed to the thrusters via the universal coupler 13. Since only a single custom PCB is typically sufficient to control all three thrusters, only one module need contain the relevant PCB which is connected to the connectors 38 in the end cap and may then be connected to the other two thrusters via external cables as shown in FIGS. 8 and 9. Alternatively, the end-cap 20 may be designed to include a common bus for the thrusters, thus requiring only one thruster to be connected to a custom PCB in one of the modules.

One or more of the modules 29 may contain circuitry for controlling functions of the robot 11 such as power or elevation. One of the modules 29 may also contain circuitry for the sensor head 12 thus obviating the need to provide dedicated components in the sensor. By such means, the modular robot 11 according to the invention allows a simple and inexpensive sensor head to be retrofitted to a robot having most of the control functions of the sensor. Such a sensor head may, for example, require only the rotating barrel and suitable sensors.

Figure 18:
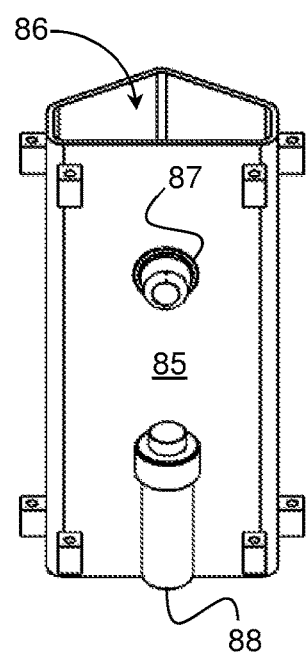
FIGS. 18 and 19 are perspective views showing cassettes having customized sensor modules each adapted to provide different functionalities.
Figure 19:
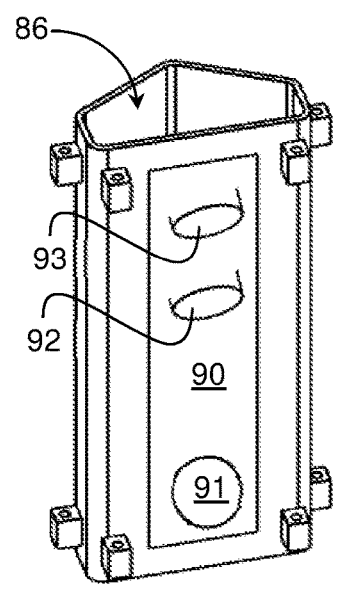

Furthermore, depending on the required functionality of the robot, different modules can be provided. The modular construction and the easy assembly allow the end-users to customize the robot according to their requirements. For example, FIG. 18 shows a custom module 85 in the form of a gas sensor in the form of a hollow canister 86 supporting on an outer surface a gas sensor element 87 and a hydrophone 88 that generates an electrical signal when subjected to a pressure change. FIG. 19 shows an alternative custom module 90 that is adapted to detect properties at the boundary between a solid and a fluid, such as at the wall of a pipeline containing or immersed in fluid. The module 90 includes a piezoelectric transmitter 91 that is activated to form ultrasonic waveforms that comprise propagated quasi leaky-Lamb waves. First and second receivers 92 and 93 separated by a known distance are supported on an outer wall of the module inclined at an angle ° toward the transmitter, the second receiver 93 being located more remote from the transmitter 91 than the first receiver 92. The angle of inclination depends on the physics that underlies the measurement principle and is clearly not a function of the present invention. But by way of example, when measurement is based on the propagation of acoustic waves through the skin of the pipeline wall, the angle of inclination may be in the order of 15-30°. Ultrasonic waveforms received by the receivers are processed by a custom PCB inside the module to determine the envelope of the waves propagating through a partition from the first receiver to the second receiver. Such a module may be used to determine the integrity of a pipeline wall using a similar approach to that described in U.S. Pat. No. 11,098,583 corresponding to EP 3 879 311 B1 in the name of the present Applicant. When the modules 85 or 90 are fitted between the opposing end-caps and power is supplied, the motherboard is connected to the custom PCB in the module and may be configured to detect the module type and configure the system resources and driver software accordingly.

The modules 85 and 90 are merely representative of possible devices that may be fitted to the modular robot. Custom modules may be provided for Power-over-Internet (PoE), flow sensors, fluid analysis, inertial measurement unit (IMU). Other modules may include a dedicated power source such as a battery or a DC-DC converter or any combination of power supply and sensor. Modules may be mixed and matched to provide more than a single functionality or to provide enhanced functionality, whereby for example, complementary functions may be controlled by respective custom PCBs in different modules.

In conclusion, there is described herein a generic modular robot structure having a frame supporting modules in the form of substantially hollow canisters that may contain a custom circuit and which are connected to at least one motherboard at an end of the frame. Connection of the modules to the motherboard is analogous to the connection of peripheral hardware to the motherboard in a computer (PC), typically via a common bus (USB) that serves to feed power and control to the custom circuits in each module. The motherboard may, and preferably does, have an operating system that supports plug-and-play so that a user need only couple or exchange a module for the new module to be detected and for the necessary system resources and driver software to be loaded. This does not preclude the possibility to configure the modules manually.

We have described, by way of example only, the connection of sensor modules in the form of either canisters that are fitted to the side of the frame or a sensor head that is fitted by a suitable coupler to a proximal end of the robot. Likewise, there have been described alternative propulsion elements that serve to propel the robot through a fluid such as water or air. Here also, different propulsion elements may be fitted to the frame according to need and the requisite power and control signals may be fed to a custom circuit for each type of propulsion element via a common host.

Many of the described modules such as those shown in FIGS. 1 to 4, 9, 18 and 19 are in the form of substantially hollow canister open at opposing ends that may contain a custom PCB having connectors that project through one or both ends of the canisters and connect to a motherboard or to a coupling element allowing the custom PCB to be connected to an external computer. Thus, within the context of the invention, although the motherboard may be a self-contained computer that serves to manage and direct features of the robot, as described above, it may simply be a universal bus or backplane to which the custom PCBs in each module are connected and which is then connected via the universal coupler to an external computer. In this case, the external computer will orchestrate the operation of the modules, thus obviating the need for the motherboard to which the custom PCBs are connected to have additional processing capability. It will also be understood that the canisters do not need to be open at their ends. For example, a sidewall of the cannister may be removeable to allow a PCB to be fitted inside and connected to plug or socket connectors at one or both ends that are then coupled to complementary connectors in the respective end caps.

It should also be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

Although embodiments of the invention have been described in detail, it will be understood that the description is not intended to be limiting, the scope of protection being provided only by the appended claims.

The invention claimed is:

1. A modular robot comprising:
   an elongated body portion having an elongated frame supported between opposing end portions of complementary shape to upper and lower end caps each configured to accommodate opposing ends of a respective interchangeable module having an elongated profile, at least one of which module contains a custom circuit configured to implement a predetermined functionality of the module, and
   a motherboard supported within at least one of the end caps at a respective end of the robot and having connectors configured to connect to complementary connectors of the custom circuit inside the modules upon assembly of the robot;
   the motherboard including a processing unit that oversees operation of each of the custom circuits.

2. The modular robot according to claim 1, wherein one of the modules contains a custom circuit for feeding power and control to at least one propulsion element mounted on the body portion.

3. The modular robot according to claim 2, wherein the at least one propulsion element is a traction element fixed to the body portion.

4. The modular robot according to claim 3, wherein the traction element is fixed to the body portion by means of a collapsible and expandable mechanism allowing a base of the traction element to be adjusted.

5. The modular robot according to claim 2, wherein the traction element is a wheel carriage or a crawler belt.

6. The modular robot according to claim 2, wherein the at least one propulsion element is a thruster fixed to an end-cap that is configured for securing to an end of the body portion.

7. The modular robot according to claim 2, wherein the custom circuit in one of the modules is associated with a component that is either part of a different module or is supported directly by the body portion.

8. The modular robot according to claim 7, wherein the custom circuit is connected to the component via the at least one motherboard.

9. The modular robot according to claim 7, wherein the custom circuit is connected to the component via a cable.

10. The modular robot according to claim 7, wherein the component is a propulsion element or a sensor or an actuator.

11. The modular robot according to claim 1, wherein each module is supported at opposite ends between respective flanges of a respective first end cap and a second end cap each of which is configured for securing to the respective ends of the modules.

12. The modular robot according to claim 1, wherein one of the modules is a sensor head removably coupled to an end of the robot via at least one universal coupler that serves to feed power and control signals to the sensor head.

13. The modular robot according to claim 1, wherein at least one of the modules is a sensor comprising a cassette supporting hardware components that are controlled via a dedicated circuit.

14. The modular robot according to claim 13, wherein the dedicated circuit is disposed inside the cassette.

15. The modular robot according to claim 1, wherein the motherboard is configured to detect and install a module, and to configure system resources and driver software for the module's hardware.

16. The modular robot according to claim 1, wherein the motherboard is a backplane that serves as a common power and data bus suitable for connection to an external computer.

17. The modular robot according to claim 1, wherein the motherboard is configured to provide a common power and data bus for each of the custom circuits.

18. A pipe-inspection system comprising:
    the modular robot according to claim 1; and
    a sensor head removably coupled to an end of the robot via a universal coupler that serves to feed power and control signals to the sensor head.

19. The pipe-inspection system according to claim 18, being dimensioned for movement along an inner surface of a pipe.

20. The pipe-inspection system according to claim 19, comprising at least one wheel carriage fixed to the body portion by means of a respective collapsible and expandable mechanism allowing adjustment of a base of the wheel carriage to fit an internal diameter of the pipe.

* * * * *